United States Patent

[11] 3,614,572

| [72] | Inventor | Thomas E. Usher |
| | | Scotia, N.Y. |
| [21] | Appl. No. | 19,870 |
| [22] | Filed | Mar. 16, 1970 |
| [45] | Patented | Oct. 19, 1971 |
| [73] | Assignee | General Electric Company |

[54] AUTOMATIC CONTROL SYSTEM FOR CROP SHEAR
11 Claims, 6 Drawing Figs.

[52] U.S. Cl. .................................................. 318/396, 83/295, 83/370, 318/626
[51] Int. Cl. .................................................. H02p 1/04
[50] Field of Search .......................................... 83/295, 370; 318/384, 396, 626

[56] References Cited
UNITED STATES PATENTS

| 3,251,255 | 5/1966 | Bauman | |
| 3,310,855 | 3/1967 | Orioli | 83/295 |
| 3,386,321 | 6/1968 | Maxwell | 83/370 |
| 3,439,849 | 4/1969 | Matsuzaki et al. | 83/295 UX |
| 3,490,322 | 1/1970 | Romes | 83/295 |

Primary Examiner—Oris L. Rader
Assistant Examiner—K. L. Crosson
Attorneys—John B. Sponsler, James C. Davis, Jr., Richard E. Hosley, Frank L. Neuhauser, Oscar B. Waddell and Joseph B. Forman ABSTRACT: A computer is used to determine the time and position at which a rotary crop shear is started so that the ends of an approaching slab will be cropped at desired crop lines. The computer calculation is based on the principle that the area under the velocity-time profile on the shear equals the distance traveled by the shear blades. A motor speed regulator provides a predictable velocity-time characteristic and a maximum acceleration independent of slab speed to reduce cutting errors. The shear/slab speed ratio is adjustable.

INVENTOR
THOMAS E. USHER

AUTOMATIC CONTROL SYSTEM FOR CROP SHEAR

BACKGROUND OF THE INVENTION

This invention relates to an automatic control system for a crop shear of the type used in a hot strip mill to square the ends of a hot metal slab passing through the mill.

In a hot strip mill heated metal slabs are passed through a series of rollers called roughing stands which progressively reduce the slab thickness. This process causes irregularities on the head and tail ends of the slab due to deformation of the ends without restraint. Prior to entering the finishing stands it is common practice to square the irregular slab ends with a rotary cutting or cropping machine known as a crop shear. It consists of a pair of massive rotating cylinders provided with shear blades disposed on opposite sides of the slab path arranged to cut the slab at the desired crop line when rotated in opposite directions by a drive motor.

In order to prevent excessive scrap loss the head and tail end crops should be a short as possible. This requires precise synchronization of the moving slab and the rotating shear so that the ends of the slab will be sheared at a predetermined crop line. This synchronization process is difficult because of the shear, being a massive device of considerable power, has substantial inertia and so cannot be accelerated to slab speed instantaneously. Further, in a continuously operating mill the speed of the slab approaching the shear often requires adjustment. Thus the moving slab may be accelerating, decelerating or moving at different velocities as the slab proceeds through the shear. Further, it is often desirable to have different relative velocities between the shear blades and slab ends for the head and tail end cuts for the purpose of causing greater physical separation of the crops from the cropped slab. This facilitates removal of the crops via a crop disposal chute.

In order to achieve greater precision in synchronizing the shear and slab movements and thereby reduce scrap loss by accurate slab cropping at optimum positions, automatic controls for the shear drive motor have been developed and used. While those controls have been successful they are complex and hence costly to build and service. One reason for their complexity and cost has been the need for elaborate feedback equipment. Such equipment is used to regulate and position continuously the shear blades relative to the approaching slab during the interval when the shear blades are moving from a stationary "park" position to a "cut" position at which the shearing operation takes place.

Accordingly, it is an object of this invention to provide an improved automatic control system for a crop shear which achieves the desired synchronization between the slab and shear velocities in a relatively simple manner so that the control equipment is less costly to build and service.

A further object of the invention is to provide an improved automatic control system for a crop shear which does not require position feedback control after movement of the shear blades has been initiated.

A still further object of the invention is to provide an automatic control system for a crop shear that reduces the time interval during which the shear is accelerating thereby improving the cutting accuracy.

Another object of the invention is to provide an automatic control system for a crop shear utilizing a simplified system for calculating the position of the approaching slab at which the shear must be initiated to crop the slab at the desired crop line.

Further objects and advantages of the invention will become apparent as the following description proceeds.

SUMMARY

In accordance with the invention, a computer is used to determine the time and slab position at which the shear movement must be initiated so that the slab will be cropped at the desired crop line. This is continuously compared with the position of the slab as it approaches the shear. When the two positions are the same the shear is initiated. The calculation of the shear-initiate position of the slab is based on the principle that area under the velocity-time profile of the shear equals the distance traveled by the shear blades from the park to the cut position. Calculation of this area by a process of integration is simplified by use of a speed regulator for the shear drive motor which causes the shear to accelerate at a fixed predictable rate regardless of slab speed. When the shear speed reaches the slab speed as measured by a slab speed sensor, the regulator is controlled by a slab speed signal so as to synchronize the shear speed with the slab speed during the remainder of the shear motion to the cut position.

By adjustment of the magnitude of the slab speed signal fed to the regulator the ratio of the shear speed to the slab speed at the instant of cut may be varied. Since the shear always accelerates at a fixed maximum rate regardless of slab velocity, the velocity-time profile of the shear is more consistently reproducible during operating cycles of the shear and more easily calculated thereby improving the control system accuracy and simplifying the computer operation. Further, the accuracy of the control system is improved by reducing the operating time of the shear as compared with prior art systems wherein the shear acceleration has been varied during each operating cycle of the shear to match the velocity of the approaching slab. Still further, this system requires no position feedback control as will be more fully explained hereinafter.

For a better understanding of the invention, reference should be made to the following detailed description taken in connection with the accompanying drawings.

DESCRIPTION OF THE ILLUSTRATED EMBODIMENT

Figure 1:
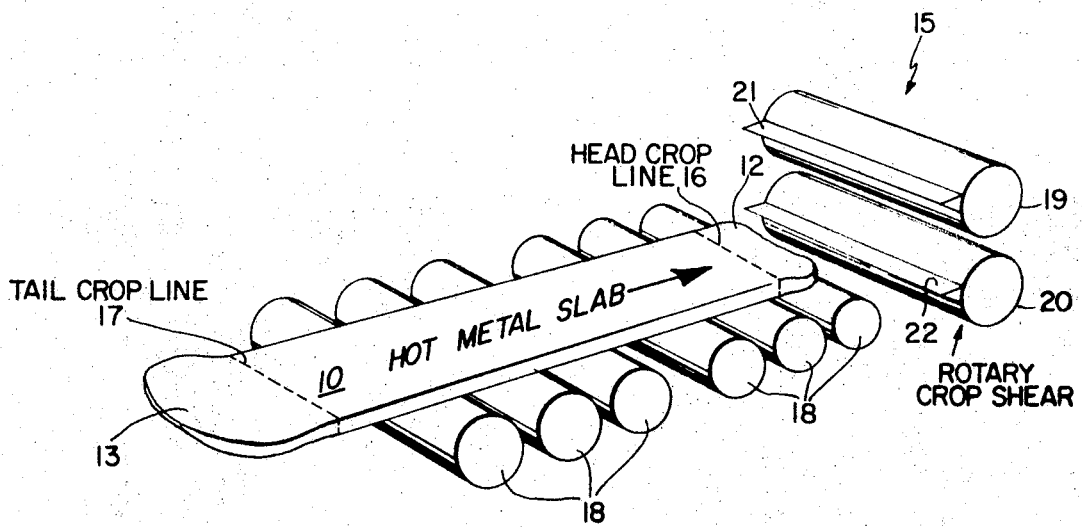
FIG. 1 illustrates the manner in which irregular ends of a moving slab are squared or cropped along head and tail crop lines when moved through a rotary crop shear.
Figure 2:
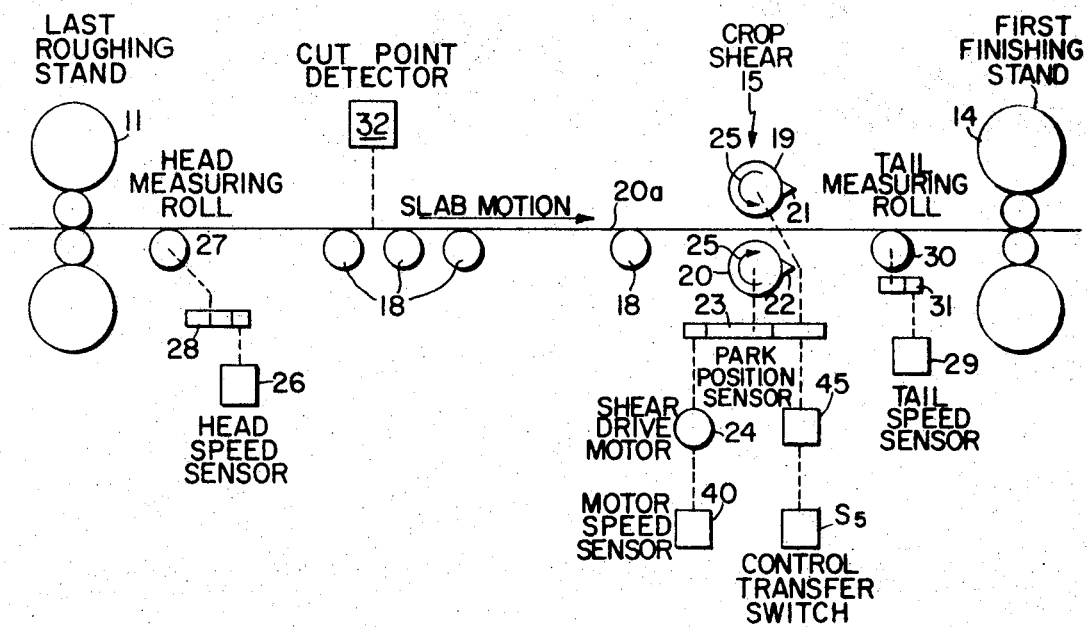
FIG. 2 shows a portion of a hot strip mill in which a rotary crop shear is used to crop ends of a hot metal slab moving through the mill. It also illustrates the positions of sensors used to control the shear.
Figure 3:
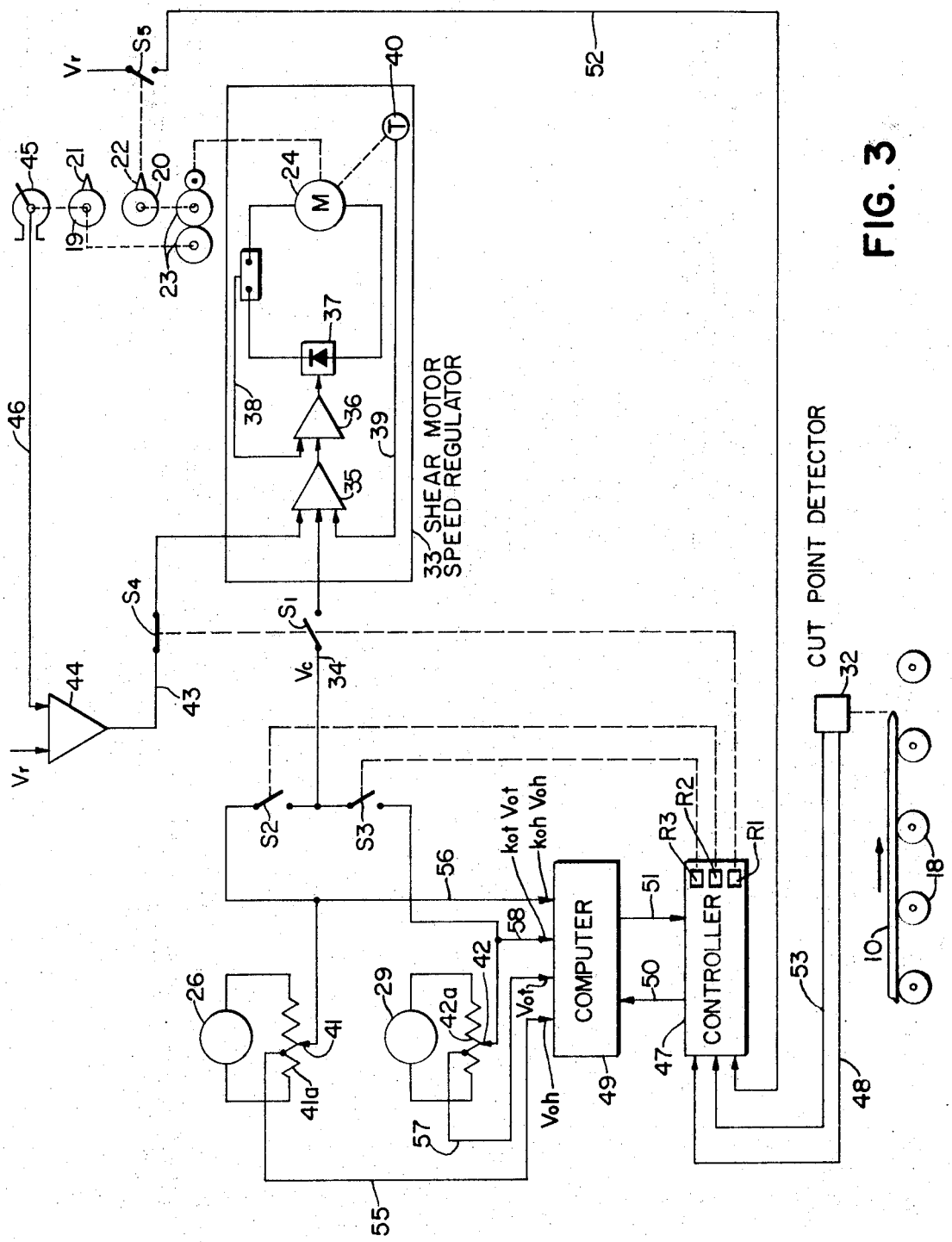
FIG. 3 shows a control system embodying the invention used to control the crop shear.
Figure 5:
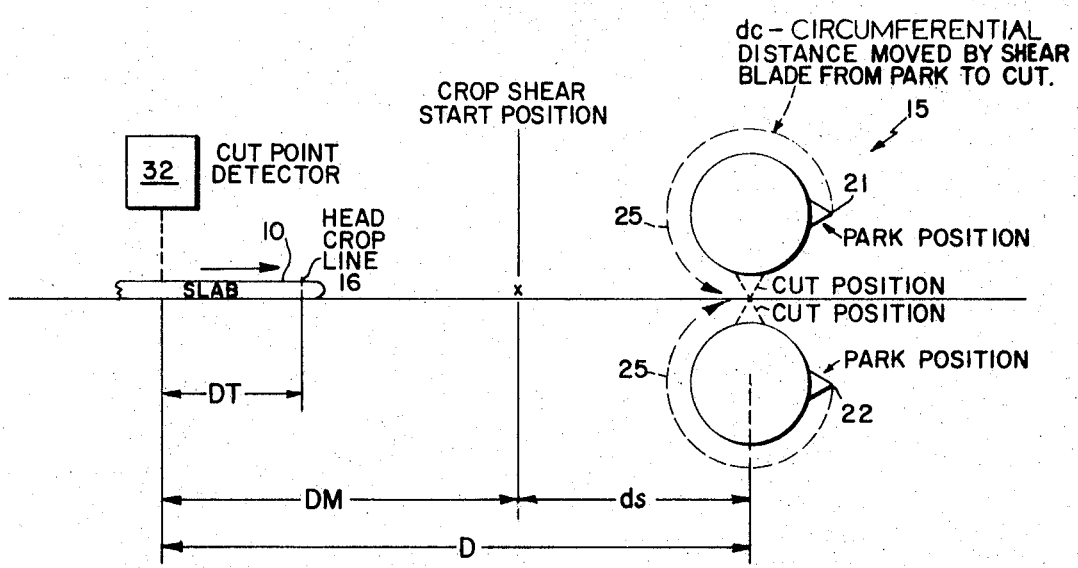
FIG. 5 is a geometrical diagram illustrating certain physical dimensions used in calculating the position of the slab at the time the shear must be started to crop the slab at the desired crop line.

In a hot strip mill metal slabs to be rolled are heated and then passed through a series of roughing stands to reduce slab thickness. During this process the ends become deformed because of lack of restraint and form irregularities. These irregular ends must be squared off or cropped before feeding the slab into the finishing stand. For this purpose a cutting machine known as a rotary crop shear is used. The cropping operation is illustrated in FIGS. 1, 2 and 5. A heated metal slab 10 after passing through the last roughing stand 11 has deformed head and tail ends 12 and 13 which must be cut off before the slab enters the first finishing stand 14. This is accomplished by passing the slab through a rotary crop shear 15 which is actuated at a proper time to cut the slab head and tail ends 12 and 13 at predetermined crop lines 16 and 17. During movement between the last roughing stand 11 and the crop shear 15, the slab 10 is supported on and driven by rollers 18. The rollers 18 are driven by motors (not shown) the speed of which is adjustable so that the slab speed can be controlled. By adjusting the speed of the rollers 18 the speed of the slab as it enters the first finishing stand can be varied as required by the rolling process as will be understood by those skilled in the art.

The rotary crop shear 15 comprises two massive rotary cylinders 19 and 20 having their longitudinal axes perpendicular to the path of the slab through the shear. The shear cylinders are provided with cutting blades 21 and 22 and are driven in synchronism through gears 23 by a DC drive motor 24. The blades 21 and 22 engage the slab simultaneously at the top and bottom sides and so penetrate and cut the slab at the crop line when the blades are in the vertically aligned position shown by dotted lines in FIG. 5. This is referred to hereinafter as the "cut" position. When the shear is at rest the blades occupy the position shown by the solid lines in FIG. 5 referred to hereinafter as the "park" position. The park position is an exact starting position wherein the blades are outside of the cutting zone to permit passage of the slab between the shear cylinders 19 and 20. In a typical park position shown in FIG. 5 the blades are 270° ahead of the cut position for opposite rotation of the shear cylinders during the cutting operation indicated by arrows 25.

The present invention relates to a new and improved control system for the drive motor 24 of shear 15 so arranged that when the head and tail end crop lines 16 and 17 of slab 10 progress to a shear start position X (Fig. 5) the motor is energized to begin motion of the shear from the park to the cut position. The position X is determined for each cut by a computer so that the crop lines and the shear blades reach the cut position of the shear at the same time to effect a cut or crop at the desired location. This involves sensing of slab velocity and acceleration and also control of the drive motor start time, acceleration and speed in a manner now to be described in detail.

Calculation of the shear start position X requires sensing of the slab speed as the head and tail crop lines approach the shear. It requires also detection of the arrival of the head and tail crop lines at a reference position located a predetermined distance D ahead of the shear cut position. It further requires speed regulation of the shear drive motor so that the shear movement has a predetermined and predictable velocity-time characteristic. The manner in which these quantities are sensed, detected and controlled will be described first. The operation of a computer used to calculate the start position X using these quantities as inputs will then be described along with related shear initiation and control circuits.

As the head end 12 of the slab 10 approaches the shear 15, its speed is measured by a head speed sensor 26 driven by a head measuring roll 27 through gearing 28. The head speed sensor may, for example, be a tachometer generator producing an output signal voltage variable in accordance with the slab head velocity. Since the slab will be in a different location and may be moving at a different velocity by the time the tail end 13 of the slab approaches the shear, its speed is measured by a second speed sensor 29 similar to sensor 26 and driven by a tail measuring roll 30 through gearing 31. As shown, the tail measuring roll is located further along the slab motion path 20a, its location being coordinated with the approximate length of the slab being cropped. It will be understood that the head and tail measuring rolls 27 and 30 are driven by frictional engagement with the moving slab. Other known types of speed sensors such as those using laser and microwave beams may also be used.

Detection of the arrival of the head and tail crop lines 16 and 17 at a fixed point located a distance D ahead of the crop shear, which is also ahead of the shear start point X, is accomplished by a cut point detector 32. The cut point detector may operate in connection with a known type of slab width scanner and emit head and tail arrival signals when the desired head and tail croplines pass the detector location. The operation of such a detector in a crop shear control system is described in U.S. Pat. No. 3,386,321, Maxwell, to which reference may be made for further description. Other types of cut point detectors may also be used such as a hot metal detector which senses the arrival of the slab end. The crop lines may then be established at predetermined distances from the end of the slab.

A speed regulator 33 for the shear drive motor 24 has an input circuit 34 energized by a control voltage $V_c$ and controlled by a start switch $S_1$. The control voltage $V_c$ is supplied by either the head speed sensor 26 or the tail speed sensor 29 as determined by selective closure of switches $S_2$ and $S_3$. When switch $S_1$ is closed the regulator control voltage $V_c$ is supplied to the input side of a summing amplifier 35 whose output is connected to a second summing amplifier 36. The output of amplifier 36 is used to control the current supplied to shear drive motor 24 through a suitable control device such as a voltage controlled rectifier 37.

The speed regulator 33 has a plurality of control loops two of which control loops are illustrated. It is necessary for maximum accuracy that the speed of the shear motor follow a predetermined and reproducible speed reference. On the other hand the voltage $V_c$, corresponding to slab velocity, as initially applied is a step speed command that cannot be followed by a practical physical system. Accordingly, it will be appreciated by those skilled in the art that a ramp function generator (not shown) or other equivalent means are employed within regulator 33 to produce a control signal having a velocity vs. time magnitude which is compatible with the capabilities of the particular physical system in respect to acceleration. Then when control voltage $V_c$ is applied to the regulator the speed of motor 24 increases in a controlled manner and as illustrated in FIG. 4, for example.

Figure 4:
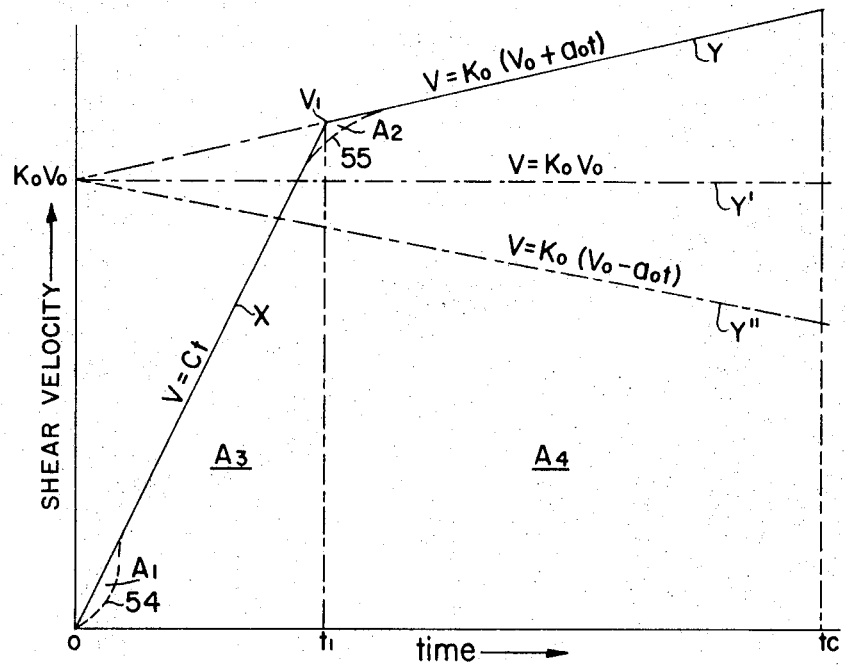
FIG. 4 is a graphical representation of the velocity-time profile or curve of the crop shear movement.

With further reference to FIG. 4, closure of switch $S_1$ at time zero causes the shear to accelerate at a fixed rate as indicated by the slope of the portion X of the curve. At a time $t_1$ the speed limit action of the regulator becomes effective as indicated by the slope of the Y-portion of the curve. The solid Y-portion of the curve illustrates a case where the velocity of the slab is increasing; i.e., accelerating, beyond the time $t_1$. The dotted portion Y' illustrates the case where the slab velocity remains constant while the dotted portion Y'' illustrates the case where the slab velocity is decreasing; i.e. decelerating.

As pointed out above, the speed regulator 33 operating in conjunction with the speed sensors 26 and 27 adjusts the speed of the shear so that at the time of cut the speed of the shear blades will bear a fixed relation to the speed of the approaching slab. It is desirable to provide a speed adjustment so that at the instant of cut the relative velocity of the shear blades and the slab may be varied. For example, at the instant of cut for the head end it may be desirable to have the shear blade speed greater than slab speed to push the head crop ahead of the slab and into a crop chute. In the case of the tail cut it may be desirable to have the shear blade speed less than slab speed so that the tail crop will be pushed back from the slab into a crop chute. Still other relative speeds may be desired to control the configuration of the cut for better acceptance of the cropped slab as it passes into the first finishing stand. To provide such relative speed adjustments for the head and tail end crops adjustable potentiometers 41 and 42 are connected respectively across the outputs of the head and tail speed sensors 26 and 29. By adjusting these potentiometers, the ratio of the sensor output voltage and the regulator control voltage $V_c$ may be varied which will cause a corresponding change in the ratio of the shear blade speed to the slab speed at the instant of cut. In the shear start time calculation, to be described below, this ratio is designated as the lag/lead speed multiplier $k_0$ where $k_0$ is the ratio between the shear speed and the slab speed at the instant of cut.

The regulator 33 has an additional input circuit 43 controlled by a park switch $S_4$ by means of which the shear motor 24 is controlled so as to move the shear blades to the park position after a cut has been made. The input circuit 43 is energized by a summing amplifier 44 having a reference voltage $V_R$ supplied to its input side. When switch $S_4$ is closed, a control voltage is applied to control rectifier 37 through circuit 43 and amplifiers 35 and 36 to energize motor 24 and cause rotation of the shear blades. A park position-sensing potentiometer 45, driven by the shear, controls a feedback voltage supplied to amplifier 44 through feedback circuit 46 in a manner to zero the output voltage of amplifier 44 and hence stop motor 24 when the shear reaches the park position. The regulator start switch $S_1$, the head and tail speed sensor switches $S_2$ and $S_3$ and the park switch $S_4$ are actuated by relays $R_1$, $R_2$ and $R_3$ embodied in a controller 47 used to control the crop shear.

At the beginning of the operating cycle, a relay $R_1$ in controller 47 is positioned to close park switch $S_4$ and open shear start switch $S_1$ so that the shear blades are moved to and maintained in the park position. As slab 10 approaches the shear on powered rollers 18 a point is reached where the location of the head crop line 16 lies in a predetermined position with reference to cut detector 32 which then sends a head-cut signal to controller 47 via lead 48. This signal operates a relay $R_2$ to close switch $S_2$ connecting head speed sensor 26 to the shear start circuit 34. At this point start switch $S_1$ is open so that the shear is not started. At the same time a signal is sent to a computer 49 via lead 50 to begin a calculating operation. In a manner to be described the computer begins to calculate repeatedly two quantities and to compare their relative magnitude. The first quantity DT represents the distance the head crop line 16 has moved toward the shear beyond the cut point detector 32. The second quantity DM represents the distance of the crop shear start position X from the cut point detector. The computer repeatedly compares the two calculated quantities DM and DT. When the slab progresses toward the shear to the point where the head crop line reaches the point X, the two quantities DM and DT are equal. When this condition occurs the computer sends a signal to the controller via lead 51 to operate relay $R_1$ closing the shear start switch $S_1$ and opening the park switch $S_4$. This causes the shear to accelerate until the shear blades acquire a velocity determined by the output of head speed sensor 26 and the speed adjustment of potentiometer 41. At a time $t_c$ (FIG. 4) after the shear starts, the blades 21 and 22 of the shear have rotated to the cut position shown by the dotted lines (FIG. 5) to crop the slab at head crop line 16 which at that time has reached the shear. At that point a control transfer switch $S_5$ actuated by the shear closes and sends a voltage reference signal $V_R$ to the controller via lead 52. This signal actuates relay $R_1$ back to its original position opening start switch $S_1$ and closing park switch $S_4$ so that the shear is returned to the park position. It also sets the computer back to a start position so that it is ready for the next calculation.

As the slab progresses through the shear a point is reached where the location of the tail crop line 17 lies in a predetermined position with reference to cut detector 32 which then transmits a tail cut signal to the controller via lead 53. This signal operates relays $R_2$ and $R_3$ to open switch $S_2$ and close switch $S_3$ connecting the tail speed sensor 29 to the shear start circuit 34. At the same time a signal is sent to the computer via lead 50 to begin the calculating operation. The computer again calculates the quantities DM and DT for the position of the tail crop line 17 with respect to the cut point detector and the shear start position X. When these quantities are equal, a signal is sent from the computer to the controller operating relay $R_1$ to close the start switch $S_1$ and open park switch $S_4$ so that the shear is started. In this case the shear blades are accelerated to a velocity as determined by the tail speed sensor and the speed adjusting potentiometer 42 which may be different due to a change in velocity of the slab and a different setting of speed potentiometer 42 as compared with the setting of potentiometer 41. When the tail crop is made, the transfer switch $S_5$ is closed and the controller actuates relay $R_1$ opening switch $S_1$ and closing switch $S_4$ to return the shear to the park position. The computer is returned to the start position and the system is then ready for the next slab cropping operation.

COMPUTER OPERATION

The calculation of the crop shear start position X by the computer 49 is based on the principle that the area under the velocity-time profile or curve (FIG. 4); i.e., $\int V dt$, equals $d_c$ where $d_c$ is the circumferential distance moved by the shear blades from the park position to the cut position. The total area A under the curves X and Y equals the algebraic sum of the areas $A_1$, $A_2$, $A_3$, and $A_4$ where:

$A_1$ and $A_2$ = the areas between the theoretical and actual shear velocity-time profiles. The actual profiles during transient conditions are represented by the dotted lines 54 and 55 in FIG. 4.

$A_3$ = the area under the X-portion of the curve from $t_o$ to $t_1$.

$A_4$ = the area under the Y-portion of the curve from $t_1$ to $t_c$.

Thus,

1. $\quad d_c = A_3 + A_4 - A_1 - A_2$

Since the curve X is a straight line due to the constant shear acceleration characteristic of regulator 33, the area $A_3$ is triangular in shape and so may be represented by the equation:

2. $\quad A_3 = \tfrac{1}{2} t_1 V_1$ where $t_1$ = time after $t_o$ when the shear blades reach a velocity value related to the slab velocity as determined by the head and tail speed sensors 26 and 29 and the settings of the lag/lead speed multiplier potentiometers 41 and 42.

$V_1$ = shear velocity at the time $t_1$.

Also,

3. $\quad V_1 = C t_1$, where $C$ = the shear acceleration which is a constant of regulator 33 and independent of slab velocity.

Also

4. $\quad = K_o (V_o + a_o t_1)$, where $k_o$ = lag/lead speed multiplier determined by the settings of potentiometers 41 and 42.

$a_o$ = slab acceleration as determined prior to shear initiation.

From the above equations:

$$t_1 = \frac{k_0 V_0}{(C - k_0 a_0)}$$

(5)
$$A_3 = \frac{C k_o^2 V_o^2}{2(C - k_o a_o)^2}$$

Also, $$A_4 = \int_{t_1}^{t_c} k_o (V_o + a_o t) dt$$

$$= \int_{t_1}^{t_c} k_o V_o dt + \int_{t_1}^{t_c} k_o a_o t\, dt$$

Integrating:

(6) $$A_4 = \frac{k_o a_o}{2} t_c^2 + k_o V_o t_c - \left[\frac{2 k_o^2 V_o^2 C - k_o^3 V_o^2 a_o}{2(C - k_o a_o)^2}\right]$$

where $t_c$ is the time after shear initiation at which the shear blades cut.

Substituting the values of $A_3$ and $A_4$ from equations (5) and (6) in equation (1), (7)
$$d_c = \frac{k_o^2 V_o^2 C}{2(C - k_o a_o)^2} + \frac{k_o a_o t_c^2}{2} + k_o V_o t_c$$
$$- \frac{2 k_o^2 V_o^2 C}{2(C - k_o a_o)^2} + \frac{k_o^3 V_o^2 a_o}{2(C - k_o a_o)^2} - A_1 - A_2$$

Solving Equation (7) for the cut time $t_c$, (8)
$$t_c = \left\{\left[\frac{V_o^2}{a_o^2} + \frac{2(d_c + A_1 + A_2)}{k_o a_o} + \frac{k_o V_o^2}{a_o(C - k_o a_o)}\right]^{1/2} - \frac{V_o}{a_o}\right\}$$

The terms $A_1$ and $A_2$ in the above equation (8) are empirically determined and so may be stored in the computer. Other known quantities are the shear acceleration rate $C$ and the distance $d_c$ (See FIG. 5). The variables in the equation are the slab velocity $V_o$, acceleration (or deceleration) $a_o$ and the lead/lag speed multiplier $k_o$.

The above-mentioned known quantities are preset into the computer memory while the variable quantities are continuously fed to the computer during its calculating operation. Thus during a head crop, the slab velocity $V_{oh}$ is fed to the computer via lead 55, the quantity being represented by a voltage across a fixed portion of resistor 41a of potentiometer 41. Also, the quantity $k_{oh}V_{oh}$ is fed to the computer via lead 56 from the voltage output of potentiometer 41. During a tail crop the slab velocity $V_{ot}$ is fed to the computer via lead 57, the quantity being represented by a voltage across a fixed portion of resistor 42a or potentiometer 42. Also, the quantity $k_{ot}V_{ot}$ is fed to the computer via lead 58 from the voltage output of potentiometer 42. The subscripts $h$ and $t$ in the above-mentioned quantities $k_o$ and $V_o$ are used to differentiate the quantities used during the head and tail crop shear-start computations, it being understood that the general equation (8) for the quantity $t_c$ is used in both cases.

Referring now to FIG. 5 the time required for slab crop lines 16 and 17 to move from the shear start point X to the shear is the same as the cut time $t_c$ required for the shear blades to move from the park to the cut position. Thus the distance $ds$ of the point X from the shear may be expressed by the equation:

9. $\quad ds = V_o t_c + \tfrac{1}{2} A t_c^2$

The distance D from the cut point detector 32 to the shear is a known fixed distance. Thus the distance from the cut point detector to point X may be expressed by the equation:

10. $\quad DM = D - ds$

It will be understood that when operation of computer is initiated by arrival of a crop line at the location of the cut point detector the quantity $DM$, locating the point X with reference to cut point detector in the direction of slab travel, is continuously calculated. At the same time the computer continuously calculated (e.g. by a pulse tachometer and pulse counter) a second quantity DT representing the instantaneous distance of the crop line from the cut point detector from the equation:

11. $\quad DT = \Sigma V(t) dt$ $V(t)$ is velocity of the slab as measured by the head and tail end speed sensors 26 and 29. $dt$ is a time integral.

Figure 6:
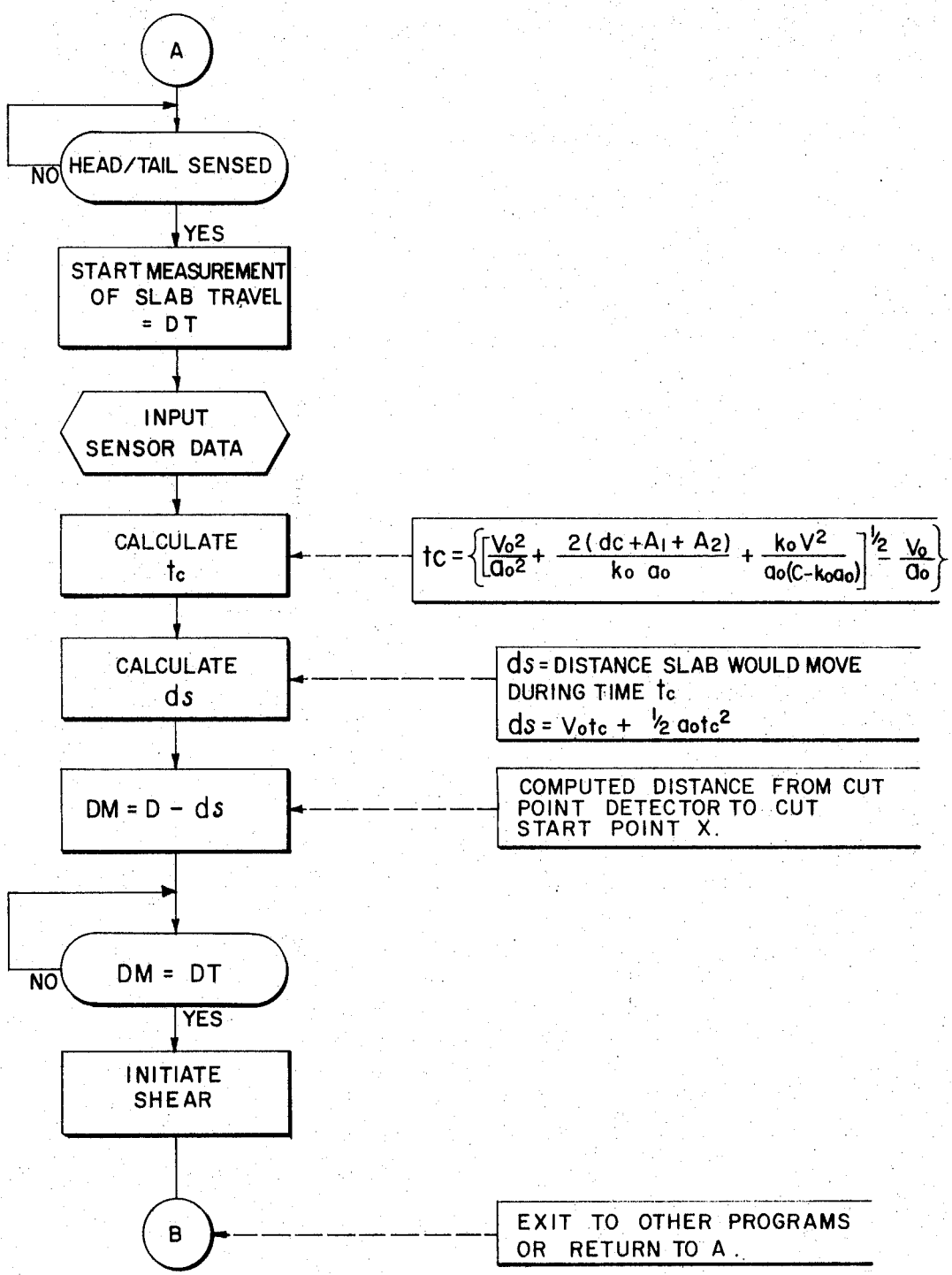
FIG. 6 is a flow diagram illustrating the calculations performed by a computer used to calculate the start position of the shear and initiate shear operation when the crop line of the slab reaches the calculated shear start position.

As indicated by the flow diagram in FIG. 6 designating operations performed between points A and B the computer computes the quantities $t_c$, $ds$, $DM$ and $DT$ and periodically compares the quantities $DM$ and $DT$. When they become equal or have a predetermined relative magnitude on arrival of the crop line at the shear start point X, a signal is sent to controller 47 via lead 51 to initiate the shear by closure of switch $S_1$.

It will be understood that the slab acceleration quantity $a_o$, being derived from successive measurements of the velocity term $V_o$, may be computed by the computer in a known manner. Alternatively, the slab acceleration may be measured by an external accelerometer and fed to the computer as a separate input.

In the above-described computer operation the shear is initiated when the two computed distances DM and DT are equal. Alternatively, and without departing from the invention, it will be obvious that the time required for the crop line to move from its measured position to the shear may be computed. This time may then be compared with the shear cut time $t_c$, the shear being initiated when these two computed times are equal.

It may be noted that since slabs cropped often have substantial thickness the cut actually starts before the point at which the blades are in direct opposition. If high precision is required a correction factor may be algebraically added to equation (1) to account for the effect of finite slab thickness on the shear park to cut rotation.

In FIG. 4 the Y-portion of the velocity-time curve slopes upward indicating an illustrative case where the acceleration term $a_o$ is positive. If the slab velocity remains constant the acceleration term becomes zero and the Y-portion of the curve becomes flat as indicated by a dash line $Y^1$. Area $A_4$ then becomes a square simplifying the area calculation. If the acceleration term $a_o$ becomes negative; i.e., the slab decelerates, the Y-Portion of the curve slopes downward as indicated by the dash line $Y''$. The correction factor $A_2$ will change slightly for the curves $Y'$ and $Y''$. While the constant acceleration characteristic of the regulator 33 which produces the straight line X-portion of the curve simplifies the calculation of area $A_3$, it will be clear that the calculating principle utilized by the present invention is applicable to all velocity-time profiles which are known and can be repetitively produced.

The computer 47 is of known construction preferably being a digital computer of the stored program type. The manner in which such a computer is programmed to perform the above-described calculations and comparisons will be apparent to those skilled in the art.

It is to be noted that the automatic control system of the present invention requires no position feedback relating the position of the shear blades to the position of the slab as required in prior art control systems designed to achieve high cutting accuracy. Thus, instead of attempting to correlate the positions of the slab and the shear after the shear motion has started, the cut time $t_c$ is calculated based on a predictable and repeatable velocity-time characteristic of the shear movement. This approach greatly reduces the cost of the control system without sacrificing cutting accuracy. Also, since the shear always accelerates at a maximum rate regardless of slab velocity, the shear operating time is reduced as compared with prior art systems where the shear acceleration has been made proportional to the approaching slab velocity. The consequent reduction in shear operating time thus improved the cutting accuracy since errors are most likely to occur during this interval.

While there has been shown what is presently considered to be a preferred embodiment of the invention, it will be apparent to those skilled in the art that various changes and modifications may be made therein without departing from the spirit and scope of the invention.

What is claimed is:

1. A control system for a motor-driven crop shear used to shear an approaching section at a predetermined crop line comprising:
   a. a shear positioned at a fixed location along the traversal path of said section to provide longitudinal movement of said section relative to the axis of said shear,
   b. control means for the shear drive motor operating, when actuated, to rotate the shear at an initial constant velocity independent of section velocity,
   c. speed-limit means responsive to the velocity of the approaching section governing said control means to limit the maximum rotational speed of the shear to a speed related to the linear speed of the section,
   d. means for detecting the location of said crop line along said section,
   e. means for calculating a shear start position at which rotation of the shear must be initiated so that the shear will crop the section at said predetermined crop line,
   f. means for continuously calculating the position of said crop line as the section approaches the shear, and
   g. means controlled by said start position and crop line position calculating means for actuating said control means when the crop line reaches said calculated shear start position.

2. A control system for a motor-driven crop shear as recited in claim 1 including means modifying the action of the speed-limit means for adjusting the ratio of shear speed to the section speed at the time the section is cropped.

3. A control system for a motor-driven crop shear as recited in claim 1 wherein the means for calculating the shear start position comprises means for integrating the area under the velocity-time profile of shear movement from a park to a cut position and equating the integrated area to the distance traveled by the shear from the park to the cut position.

4. A control system for a motor-driven crop shear as recited in claim 1 wherein the location of said crop line is determined from the geometric configuration of a section edge.

5. A control system for a motor-driven crop shear used to shear an approaching section at a predetermined crop line, said system comprising:
   a. means measuring the velocity of said section as the crop end approaches said shear and producing a velocity signal variable in accordance with said section velocity,
   b. control means for the shear drive motor responsive to said velocity signal and having a predetermined velocity-time characteristic operative, when actuated, to accelerate said shear from a park position to a speed related to the speed of said section and thereafter maintain the speed of the shear at a speed related to the approach speed of the section during continued shear movement to a cut position, and
   c. computer means having said velocity signal as an input for
      1. calculating a first quantity indicative of the instantaneous position of the crop line of the section from a reference point ahead of the shear as the section advances toward the shear, 2. calculating from said velocity-time characteristics a second quantity indicative of the position of the crop line of the section beyond said reference point at which said control means must be actuated so that said shear will crop the section at said predetermined crop line,
      3. comparing said first and second quantities as the section approaches the shear, and
      4. actuating said control means when said first and second calculated quantities have a predetermined relative magnitude.

6. A control system for a motor-driven crop shear as recited in claim 5 wherein the second quantity calculated by the computer means is determined by integrating the area under the velocity-time profile of the shear movement from the park to the cut position and equating the integrated area to the distance traveled by the shear from the park to the cut position.

7. A control system for a motor-driven crop shear as recited in claim 5 wherein the shear is accelerated at a fixed rate when the control means is actuated until a velocity related to the section velocity is reached.

8. A control system for a motor-driven crop shear as recited in claim 5 wherein the first calculated quantity is the distance the crop line of the section has advanced from the fixed reference point and the second calculated quantity is the distance of the crop line of the section from the fixed reference point at which the control means must be actuated so that the shear will crop the section at the predetermined crop line.

9. A control system for a motor-driven crop shear as recited in claim 5 including a second velocity signal producing means responsive to the section velocity as the tail end of the section approaches the shear and means transferring the section velocity input to said control means and said calculating means to said second velocity signal producing means after the shear has cropped the section at said predetermined crop line.

10. A control system for a motor-driven crop shear as recited in claim 5 including means for adjusting the magnitude of the section velocity signal fed to the control means to vary the relative speed of the shear and the section at the time the section is cropped by the shear.

11. A control system for a motor-driven crop shear as recited in claim 10 wherein the means for adjusting the magnitude of the section velocity signal fed to the control means also adjusts the magnitude of the section velocity signal fed to the input of the computer means used to calculate said second quantity.